F. IZZO.
NUT LOCK.
APPLICATION FILED SEPT. 4, 1917.
1,300,617.  Patented Apr. 15, 1919.
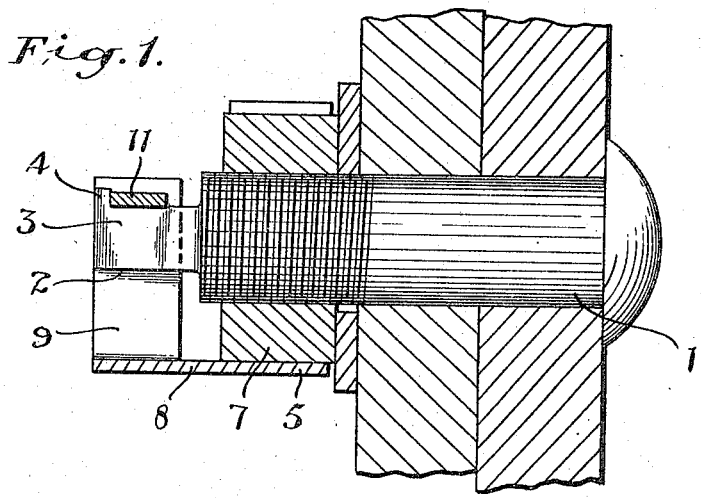
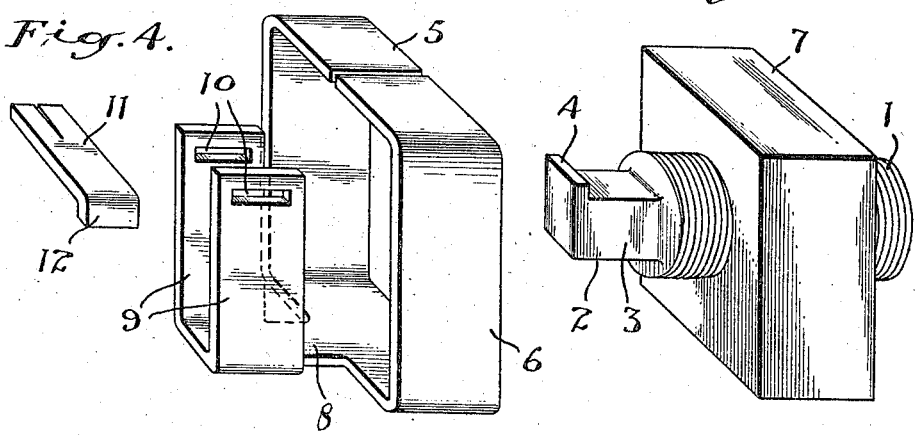
Inventor.
Francesco Izzo

UNITED STATES PATENT OFFICE.

FRANCESCO IZZO, OF TORONTO, ONTARIO, CANADA.

NUT-LOCK.

1,300,617.　　　　Specification of Letters Patent.　　Patented Apr. 15, 1919.

Application filed September 4, 1917. Serial No. 189,475.

*To all whom it may concern:*

Be it known that I, FRANCESCO IZZO, a subject of the King of Great Britain, and resident of the city of Toronto, county of York, Province of Ontario, in the Dominion of Canada, have invented certain new and useful Improvements in Nut-Locks, described in the following specification and illustrated in the accompanying drawings, that form part of the same.

The principal objects of this invention are to devise a form of nut lock which is particularly adapted for use in securing the nuts of track bolts but may be utilized for many other purposes where it is desirable to secure a nut from turning through vibration.

A further object is to devise a form of nut lock which may be very easily and quickly applied irrespective of the position of the nut in its longitudinal relation to the bolt and which may be easily and quickly removed to allow the adjustment of the nut.

The principal feature of the invention consists in the novel formation of the end of the bolt and a locking member adapted to non-rotatably embrace the end of the bolt and to engage and hold the nut whereby a reduced extension of the bolt is formed with flattened sides to engage a jaw-shaped member connected with a socket member adapted to fit over the nut.

In the accompanying drawings, Figure 1 is a sectional view through a pair of plates and a nut showing a bolt with my improved nut lock attached thereto.

Fig. 2 is a perspective view of the threaded end of the bolt with the nut thereon.

Fig. 3 is a perspective view of my improved nut lock in position to be assembled on Fig. 2.

Fig. 4 is a perspective detail of the fastening key.

It is desirable in providing a means for fastening nuts from accidental loosening to produce a device which will hold the nut securely irrespective of its position upon the bolt within certain limitations as to length and in order to accomplish this result, I form the bolt 1 with a reduced extension 2 upon its threaded end, which extension is formed with the flattened sides 3 and at its extremity is provided with a lug 4 projecting beyond one of the sides between the sides 3.

The locking member 5 is here shown of sheet metal shaped to form a loop 6 which is of corresponding shape to the nut 7 and adapted to fit loosely around the outer edge of said nut. A strip 8 projects from one side of the looped member and is formed with upwardly turned portions 9 which are parallelly arranged and spaced apart about the same width as the width of the flat turned portion of the extension 2 of the bolt and are adapted to snugly engage the sides 3 of said extension.

The upper ends of the portions 9 are formed with transverse slots 10 which are adapted to have their lower edges register with the face of the extension 2 adjacent to the lug 4.

When the nut lock is thus positioned a key 11 is inserted through the slots 10 and engages the flat side of the extension 2 of the bolt and also engages the inward side of the lug 4. The key 11 is preferably split at the end opposite to the head 12 and is adapted to be spread slightly to prevent its accidental withdrawal from the slots.

In the use of this nut lock the bolt is first placed in position and the nut screwed tightly into place. The loop member is then slipped over the nut and adjusted until the members 9 engage the flat sides 3 of the extension 2 and the key 11 is then inserted and locked by spreading the split end.

It will be readily understood that the longitudinal position of the nut may vary very considerably and the locking member will still retain a secure hold and the securing of the members 9 holds it firmly in place and prevents the accidental turning of the nut.

What I claim as my invention is:—

1. A nut lock comprising a member adapted to non-rotatably engage the perimeter of the nut and having an extension formed with a pair of members non-rotatably engaging the end of the bolt, and means engaging the pair of members and said bolt in locking contact.

2. A nut lock comprising the combination with a bolt having an extension from the threaded end formed with flattened sides, of a loop member adapted to slip over and non-rotatably engage the nut, said loop member having a pair of parallelly arranged members engaging the flat sides of the extension from said bolt, said members having slots therein, and a key adapted to be inserted through said slots and to engage the end of the bolt in locking contact.

3. A nut lock comprising the combination with a bolt having a reduced projection from the threaded end formed with flattened sides, and a recessed surface between said flattened sides, a sheet metal member formed with a pair of parallelly arranged members engaging the flattened sides of the bolt extension, and having slots through the upper ends, said member having connected thereto a socket member adapted to extend around and non-rotatably engage the nut, and a key adapted to be inserted through the slots of said member to engage the recessed surface of the bolt.

F. IZZO.

Copies of this patent may be obtained for five cents each, by addressing the "Commissioner of Patents, Washington, D. C."